C. M. ANGELL.
BATTERY COVER CONNECTION.
APPLICATION FILED SEPT. 24, 1918.
1,319,941.
Patented Oct. 28, 1919.
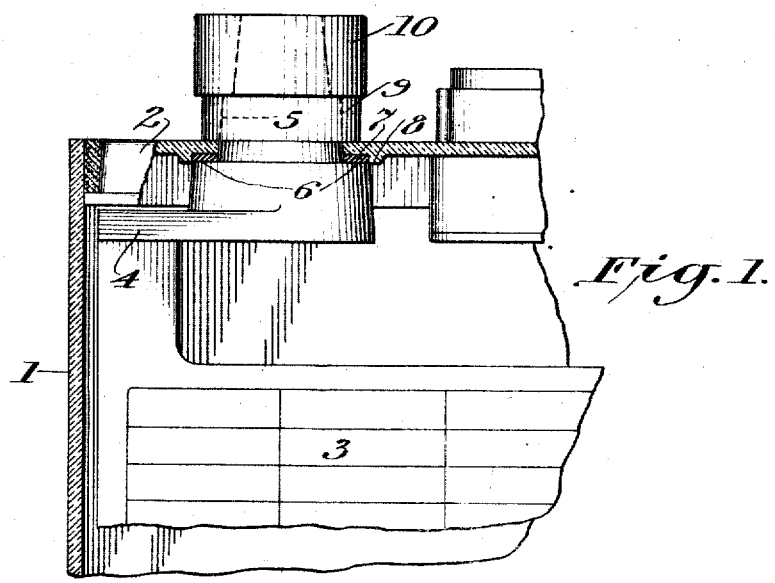
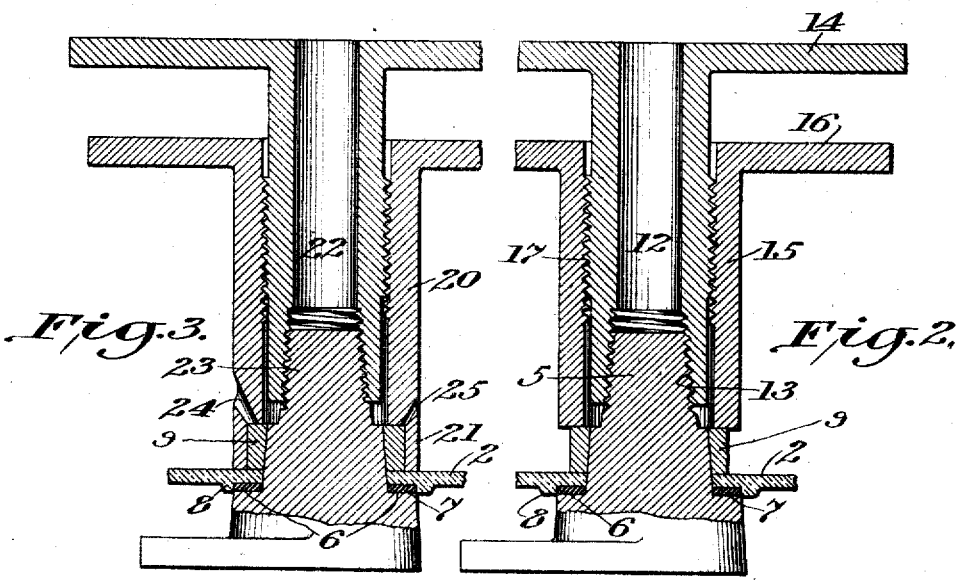
Chester M. Angell, Inventor
By Byrnes Townsend Brickenstein
Attorneys

UNITED STATES PATENT OFFICE.

CHESTER M. ANGELL, OF CHICAGO, ILLINOIS, ASSIGNOR TO VESTA ACCUMULATOR COMPANY, OF CHICAGO, ILLINOIS, A CORPORATION OF ILLINOIS.

BATTERY-COVER CONNECTION.

1,319,941.  Specification of Letters Patent.  Patented Oct. 28, 1919.

Application filed September 24, 1918. Serial No. 255,501.

*To all whom it may concern:*

Be it known that I, CHESTER M. ANGELL, a citizen of the United States, residing at Chicago, in the county of Cook and State of Illinois, have invented certain new and useful Improvements in Battery-Cover Connections, of which the following is a specification.

The present invention relates to storage batteries and more particularly to means for sealing the openings in the cover plate of a battery casing through which the terminal posts extend to the outside for connection with an electric circuit.

The problem of sealing the openings in the cover plates after the terminal posts are in final position has been approached heretofore in various ways and accomplished by various structural arrangements.

It is the object of the present invention to provide a seal which is exceedingly simple in structure and application, can be easily replaced and is reliable in its function.

In order to more fully explain the character of the invention, reference is had to the appended drawings in which—

Figure 1 is an elevational view, partly in section, of a battery seal embodying the invention;

Fig. 2 is a vertical section illustrating one way in which the invention may be carried out; and Fig. 3 is a vertical section similar to Fig. 2 showing another way for carrying out the invention.

In the drawings 1 represents the battery casing, 2 the cover plate, 3 an electrode, 4 the usual strap for interconnecting all electrodes of the same polarity and 5 a terminal post extending through an opening in the cover plate 2. The post 5 has a shoulder 6 to form a seat for the cover plate. Intermediate this shoulder 6 and the cover plate 2 is placed a gasket 7 of rubber or other suitable packing material and the cover plate 2 is provided with a depending flange 8 forming a wall around the gasket. The purpose of this flange 8 is to confine the gasket so between the cover plate 2 and the shoulder 6 that it cannot be squeezed out of its normal position when the cover plate is pressed against the shoulder to insure tightness.

Above the cover plate 2 the post 5 is provided with a leaden ring or sleeve 9 with which the present invention is principally identified. This ring, which has the purpose to hold the cover plate 2 under pressure against the shoulder 6 and to keep the gasket under such a condition of compression intermediate the cover plate and the shoulder so that it does not easily lose its effectiveness as a seal, is so secured to the post that it may be easily removed from the post without destroying the post itself or materially impairing its usefulness. Above the sleeve or ring 9 and contacting with it is a terminal 10 which may be of any suitable preferred type. This terminal 10 fits over the end of the post and is preferably burned on it to make a reliable electrical connection.

Figs. 2 and 3 illustrate two ways in which the ring or sleeve 9 may be secured on the leaden post to satisfy the requirements and accomplish the purpose for which it is intended.

After the battery is in assembled condition in the casing and the gasket 7 is confined between the cover 2 and the shoulder 6 a suitable tool is applied to press the cover plate 2 against the shoulder 6 and hold it under pressure until the ring or sleeve 9 is secured to the post 5. While there is considerable latitude in the selection of the tools suitable for carrying out this operation, I have found the tool illustrated in Figs. 2 and 3 to be particularly adapted for it. This tool consists principally of two parts, namely an element for gripping the projecting end of the post and a second element for engaging the ring or sleeve 9. The element for gripping the post consists of a cylindrical shank 12 having at its lower end a screw threaded socket 13 and at its upper end a handle 14. The element for engaging the cover plate 2 consists of a tubular body 15 surrounding the shank 12 and having at its upper end a handle 16. Relative motion between these two elements is produced by means of an external thread 17 on the shank 12 and a corresponding internal thread in the bore of the body 15.

The sleeve or ring 9 has preferably a tapered bore corresponding to the taper of the post 5 and the bore is such that an appreciable pressure must be exerted upon the sleeve 9 to force it into operative position on the post 5. When the sleeve is in initial position upon the post, the screw threaded socket 13 is placed over the end of the post and the shank 12 turned by means of the handle 14 until a firm grip is obtained. Then the tubular element 15 is advanced on the shank 12 until the sleeve 9 has gripped the post and been forced home against the cover plate 2 to put the gasket under the required degree of compression.

In order to prevent such an intimate connection between the sleeve and the post or "freezing-on" that the sleeve could not be removed without materially injuring the post, the thickness of the ring is so chosen that a suitable compromise is effected between the degree of compression of the post and the degree of expansion of the sleeve with the result that the sleeve grips the post sufficiently tightly to hold the packing ring 7 under compression, but not so that it could not be removed. While this manner of modifying the holding capacity and the degree of freezing produces entirely satisfactory results, recourse may be had to other means or methods to accomplish the purpose. The surface of post or the inner surface of the sleeve or both may be coated with a suitable substance, for instance graphite, tending to prevent or retard integration. It is understood that the determination of the thickness of the sleeve or the selection of particular parting material is largely a matter of good judgment and experience and no definite rules need be prescribed for guidance.

After the sleeve has been placed in the proper position, the tool is removed and the terminal cap 10 is placed in position and burned on. As has been previously stated, this cap 10 is preferably so placed on the post that it bears upon the sleeve 9 and thereby practically eliminates the possibility of a stripping of the sleeve 9 from the post.

Instead of forcing a sleeve upon the post, the sleeve may be cast on the post while the cover-plate is held under pressure against the gasket 7. The tool for producing this pressure is essentially the same as that shown in Fig. 2 but differs therefrom in that the tubular element 20 has an extension 21 acting as a mold. After the shank 22 is secured to the post in the manner before described, the tubular element 20 is forced against the cover plate until the gasket 22 is compressed to the required degree. Then the lead is poured into the space defined by the extension 21 and the post 23, an opening 24 and a vent 25 being provided for that purpose. The cleavage between the sleeve 9 thus formed and the post may be preserved by the same means or similar means as described before. If the sleeve is made relatively thin, the material necessary for casting it does not communicate enough heat to the post during the casting operation to melt the surface thereof.

When it is intended to remove the sleeve, whether it is cast on the post or pressed on it, the force applied to it by an ordinary gripping tool, such as a pliers or pipe-wrench is normally sufficient to break the connection between it and the post. If perchance the connection should be tighter than intended, the sleeve may be slitted and readily twisted off. Under no circumstances it is necessary to unduly mutilate the post or destroy it. The seal is absolutely reliable, since there is nothing that can alter its condition.

The ring may be made of any suitable non corrodible metal such as a lead-antimony alloy. The term "leaden" in the claims is used in a broader sense to include all suitable non corrodible metals or alloys.

I claim:—

1. A seal for a terminal post and a cover comprising the combination of a leaden terminal post having an unthreaded portion and a shoulder, a cover having an opening through which the terminal post extends, a packing between the shoulder and cover and a removable leaden ring gripping the unthreaded portion of the post and bearing on the cover plate.

2. A seal for a terminal post and a cover comprising the combination of a leaden tapering terminal post having an unthreaded portion and a shoulder, a cover having an opening through which the terminal post extends, a packing between the shoulder and cover and a removable leaden ring gripping the unthreaded portion of the post and bearing on the cover plate.

3. The method of forming a sealing connection between a battery cover and a shouldered terminal post extending through said cover and having a packing between the shoulder and cover, which consists in applying pressure to the cover plate to compress the packing and, while the pressure is maintained, fastening the cover and post together by means of a ring gripping the post and bearing on the cover.

4. The method of forming a sealing connection between a battery cover and a shouldered terminal post extending through said cover and having a packing between the shoulder and cover, which consists in applying pressure to the cover plate to compress the packing and, while the pressure is maintained, fastening the cover and post together by forcing over the post a ring to grip the post and bear on the cover.

In testimony whereof, I affix my signature.

CHESTER M. ANGELL.